United States Patent [19]

Shin et al.

[11] Patent Number: 5,470,047
[45] Date of Patent: Nov. 28, 1995

[54] ELECTRICAL FLAME SENSOR FOR USE IN A GAS CUTTING APPARATUS

[75] Inventors: Yoon-Sub Shin, Incheon; Se-Yeob Chang, Seoul; Sang-Jin Lee, Incheon; Jae-Kon Kim, Seoul, all of Rep. of Korea

[73] Assignee: Daewoo Heavy Industries Co., Ltd., Incheon, Rep. of Korea

[21] Appl. No.: 265,341

[22] Filed: Jun. 23, 1994

[30] Foreign Application Priority Data

Jun. 23, 1993 [KR] Rep. of Korea ............... 93-11530
Jun. 23, 1993 [KR] Rep. of Korea ............... 93-11531
Jun. 23, 1993 [KR] Rep. of Korea ............... 93-11532
Jun. 23, 1993 [KR] Rep. of Korea ............... 93-11533

[51] Int. Cl.⁶ .................................................. B23K 7/10
[52] U.S. Cl. ........................... 266/76; 266/80; 266/48
[58] Field of Search .................. 266/48, 58, 76, 266/78, 80; 148/195, 196

[56] References Cited

U.S. PATENT DOCUMENTS 2,949,391   8/1960   Anderson ............................ 148/195
4,363,468  12/1982   Noe ..................................... 266/76

FOREIGN PATENT DOCUMENTS

0282802   9/1990   Germany ............................. 148/195
53-34578   3/1978   Japan.

Primary Examiner—Scott Kastler
Attorney, Agent, or Firm—Townsend and Townsend and Crew

[57] ABSTRACT

A flame sensor of the present invention for use in a gas cutting apparatus is capable of directly measuring an electrical current flowing through a flame formed between the torch and the workpiece and includes a first terminal coupled to the torch; a second terminal coupled to the workpiece; and a sensing portion for detecting a current between the first and the second terminals, and generating a current sense signal.

8 Claims, 8 Drawing Sheets

ELECTRICAL FLAME SENSOR FOR USE IN A GAS CUTTING APPARATUS

FIELD OF THE INVENTION

The present invention relates to a flame sensor for use in a gas cutting apparatus; and, more particularly, to a flame sensor for use in a gas cutting apparatus, which is capable of electrically detecting the state of a flame formed between a torch and a workpiece to thereby enable the gas cutting apparatus to automatically accomplish a reliable cutting operation.

DESCRIPTION OF THE PRIOR ART

Conventional gas cutting apparatus is designed to cut a workpiece, e.g., a metal sheet, in desired configurations. A torch provided in the gas cutting apparatus is preferably moved along a predetermined line with an appropriate spacing from the metal plate to thereby ensure a uniformity of the cut line. Therefore, in order to meet the spacing requirement, there have been proposed various gas cutting devices employing a flame sensor, which are capable of automatically controlling the cutting operation.

For example, Japanese Patent Publication No. Sho 53-34578 discloses a gas cutting apparatus which employs a device for detecting the state of a flame by sensing a back pressure of the flame rebounded from the workpiece. The back pressure detecting device is located in an annular groove around an oxygen discharge port to detect the pressure of a stream of pure oxygen and the flame reflected from the surface of the workpiece. The detected pressure is converted into an electrical signal to be transmitted to a processor for controlling the cutting mechanism of the gas cutting apparatus. When the torch is located at a higher position than a predetermined height, since the pressure detected by the device has a lower value than a predetermined value, the processor sends a command signal to lower the elevation of the torch. On the other hand, if the torch is located at a lower position than the predetermined height, since the pressure has a higher value than the predetermined value, the processor sends a command signal to raise the torch portion. The prior back pressure detecting device also serves to determine that the flame is blown out, depending on the variation of the back pressure.

However, this prior art device has proven to lack its overall efficiency, because of its tendency to lose the detecting reliability where there is a contamination of the annular groove or a variation in the flow rate of the fuel gas. In addition, the detecting device requires an individual pressure sensor for converting the back pressure to an electrical signal as well as a cutting tip equipped with a back pressure receiver. Moreover, when the torch is inclined to accomplish a chamfering operation on the workpiece, the detecting device is may not be able to accurately detect or measure the back pressure of the flame reflected from the workpiece since an upper portion of the inclined flame may be dissipated to the atmosphere. Further, the gas cutting apparatus is handicapped by the bulky mechanical component required to support the back pressure detecting device and an increased manufacturing cost thereof.

SUMMARY OF THE INVENTION

It is, therefore, an object of the present invention to provide a flame sensor for use in a gas cutting apparatus having a torch, which is capable of electrically detecting the state of the flame formed between the torch and a workpiece.

It is another object of the present invention to provide a gas cutting apparatus having a torch and a flame sensor for electrically detecting the state of the flame formed between the torch and the workpiece, which is capable of providing a reliable and cost effective cutting operation.

The above and other objects of the present invention are accomplished by providing a gas cutting apparatus for automatically cutting a workpiece in accordance with a predetermined contour, having a torch for spurting a flame and a torch drive means, which comprises: a current sensing means for supplying a current via the flame and generating a current sense signal representative of the amount of the current flowing through the flame; and a control means responsive to the current sense signal for generating a control signal to be coupled to the torch drive means.

BRIEF DESCRIPTION OF THE DRAWINGS

The above and other objects, advantages and features of the present invention will be apparent from the following description of preferred embodiments taken in conjunction with the accompanying drawings, wherein.

DETAILED DESCRIPTION OF THE PREFERRED EMBODIMENTS

Figure 1:
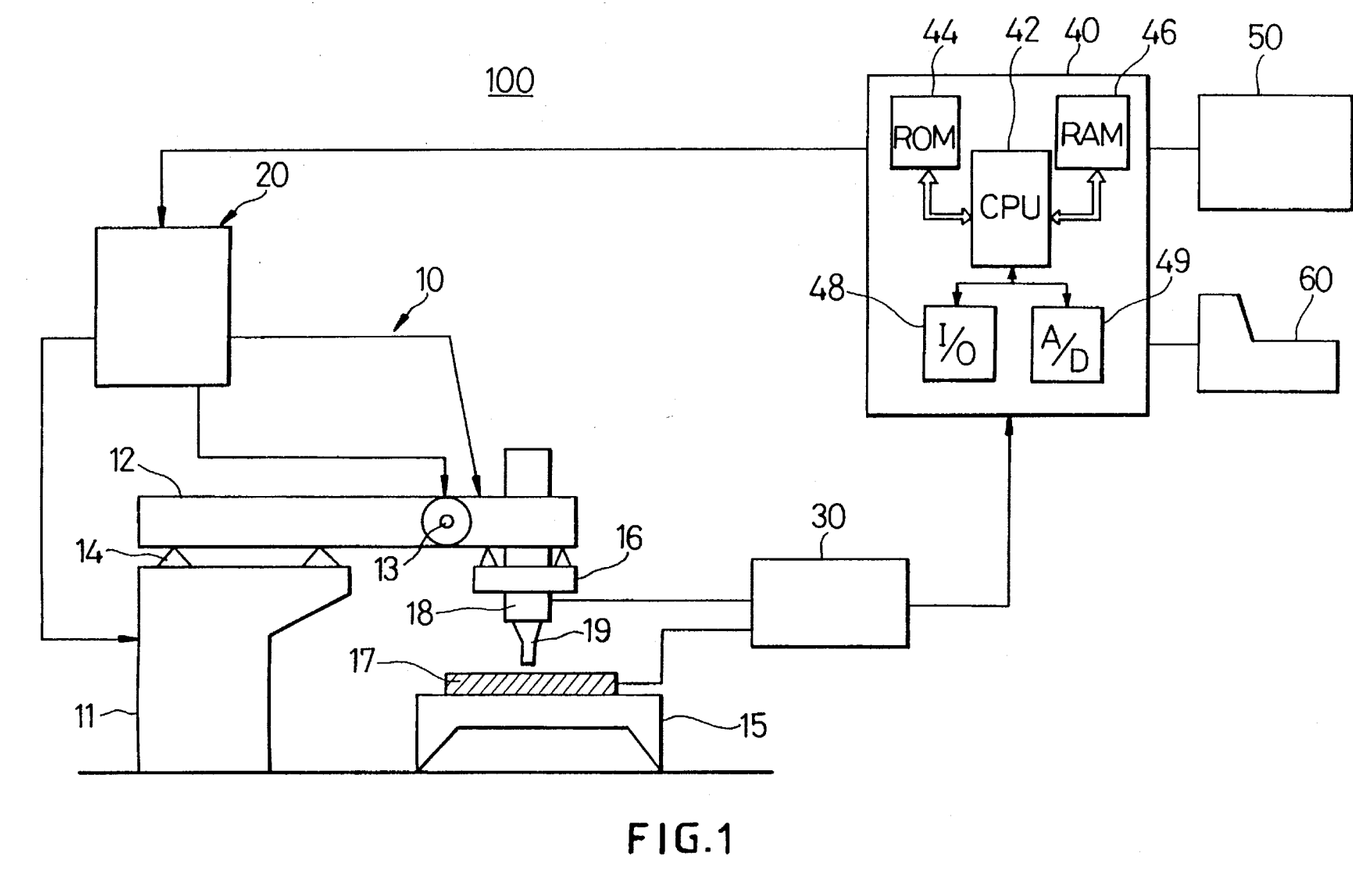
FIG. 1 is a schematic diagram of a gas cutting device employing the novel flame sensor.

Referring first to FIG. 1, there is shown a circuit diagram for a gas cutting apparatus employing a flame sensor in accordance with the present invention. The gas cutting apparatus 100 comprises a cutting mechanism 10, a cutting mechanism driver 20, a flame sensor 30, a microprocessor 40 and I/O devices 50 and 60.

The cutting mechanism 10 includes a main body 11 having a guide member 14 at its upper portion, a first slider 12 movable along the guide member 14 to and fro, a second slider 16 movable along the first slider 12 in the direction of the right and left, and a torch 18 movable through the first and the second sliders 12 and 16 upwardly and downwardly. The first slider 12 has an articulated member 13 for adjusting an angle of the torch 18. The torch 18 is provided with a tip portion 19 having a plurality of supply channels for discharging a fuel gas and oxygen to form a flame. Located under the tip portion 19 of the torch 18 and on a bed 15 is a workpiece, e.g., a metal sheet 17 to be cut.

These components of the cutting mechanism 10 are driven by the conventional cutting mechanism driver 20 which is responsive to control signals provided by the microprocessor 40 and may include a hydraulic system or a servo system actuated by a electrical control signal.

The flame sensor 30, as will be described in detail hereinafter, serves to detect the current flow through a flame formed between the torch 18 and the workpiece 17, and to generate a current sense signal which represents a voltage corresponding to the detected current and is coupled to the microprocessor 40.

The microprocessor 40 includes a central processing unit (CPU) 42, a ROM (Read Only Memory) 44, a RAM (Random Access Memory) 46, an input/output (I/O) interface 48 and an analog digital (A/D) converter 49. The CPU 42 receives the current sense signal through the A/D converter 49 and coupled to the I/O devices, e.g., computer aided design (CAD) system 50 and a control console 60 via the I/O interface 48. The CAD system 50 and the control console 60, as well known in the art, serves to generate cutting contour information and user setting information, respectively. The CPU 42, which is coupled to the cutting mechanism driver 20 via I/O interface 48, serves to receive the cutting contour information and the user setting information and to generate the control signal. The I/O interface may include a plurality of photo couplers (not shown) which serve to electrically isolate the microprocessor 40 from the cutting mechanism driver 20 having a high voltage drive source.

The microprocessor 40 has a numerical control function to control various operations of the gas cutting machine including discharging a fuel gas and oxygen to form a flame, controlling the torch home position, and controlling the movement of the components of the cutting mechanism 10 in accordance with cutting information inputs from the CAD system 50 and the control console 60. The control console 60, as is well known in the art, includes a monitor and a key board for user interfacing.

Because of the large number of functions to be controlled by the microprocessor 40, only those connections of the microprocessor 40 relevant to the flame sensor, are shown in FIG. 1. The microprocessor 40 also has a function for determining the state of the flame in response to the current sense signal from the flame sensor 30. Although the numerical control function and the determination function are contained in one microprocessor 40 in the form of software as shown in FIG. 1, an individual microprocessor only for performing the determination function is preferably incorporated in the sensor 30.

Figure 2:
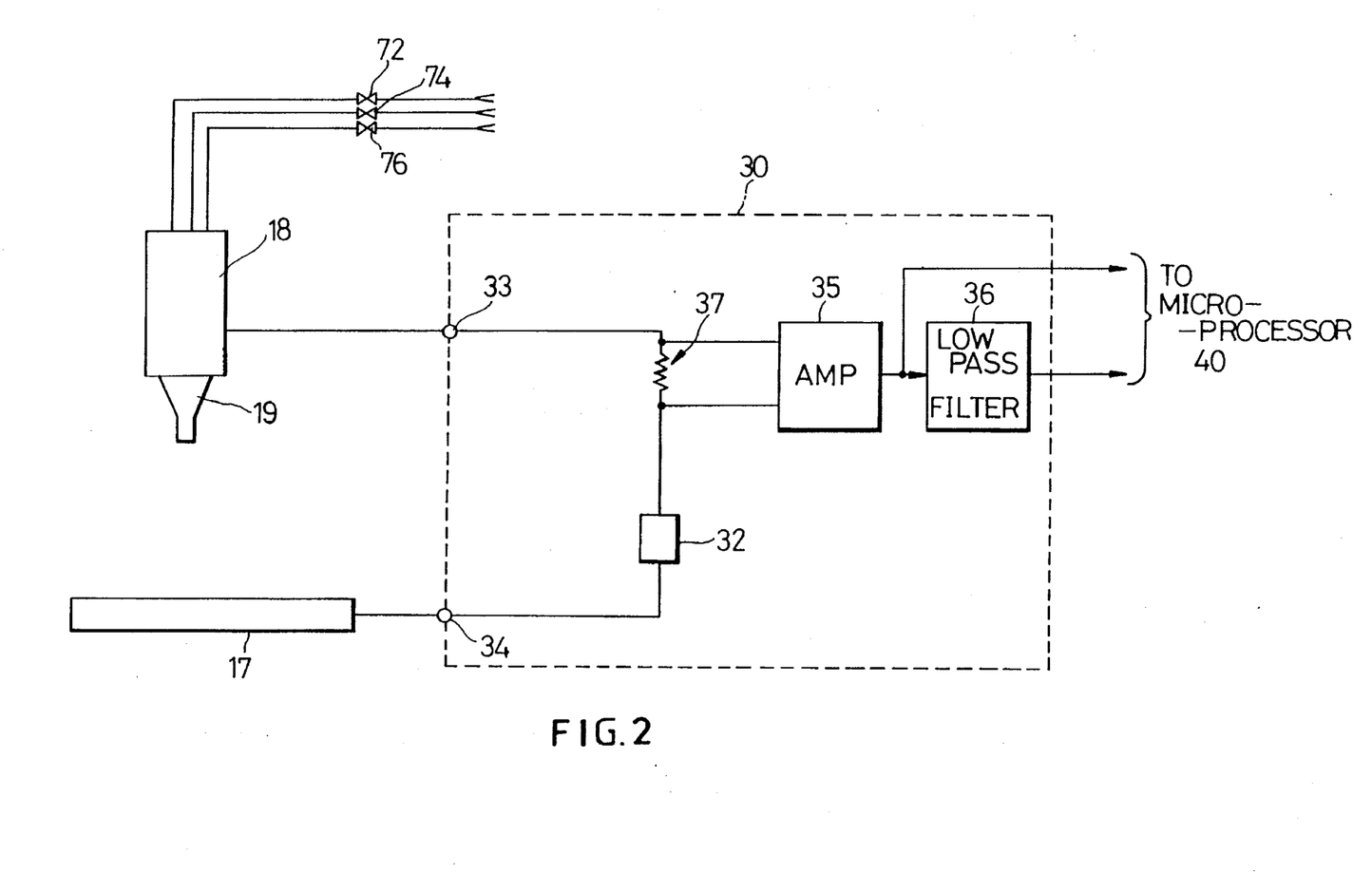
FIG. 2 is a schematic diagram depicting the flame sensor and the torch shown in FIG. 1.

Referring to FIG. 2, there are shown the key elements constituting the flame sensor 30. As shown, the flame sensor 30 includes a current sensing resistor 37, a constant voltage source 32, e.g., a battery, an amplifier 35 and a low pass filter 36. The current sensing resistor 37 is coupled between a terminal 33 and the constant voltage source 32 which is also coupled to a terminal 34. The terminals 33 and 34 are coupled to the torch 18 and the workpiece 17, respectively.

The torch 18 is located over the metal sheet 17 to provide a continuous flame impinging on the sheet 17. The torch 18 has a number of supply channels, i.e., a fuel gas channel 72, a first oxygen channel 74 for supplying a stream of oxygen in order to maintain the preheating flame and a second oxygen channel 76 for supplying another stream of oxygen during the cutting step.

To start a cut at the edge of the metal plate 17, the preheat flame is placed just over the edge to heat the metal plate. When the plate 17 is heated to red, the cutting oxygen is turned on, and the torch 18 moves over the plate 40 to start the cut. Therefore, the oxygen gas cutting is accomplished through the use of a chemical reaction in which preheated metal is cut, or removed, by rapid oxidation in a stream of pure oxygen.

During the cutting operation, the oxygen and fuel gas flows through separate channels 72, 74 and 76 to the cutting torch 18 at pressures controlled by a pressure regulator (not shown), provided in the cutting mechanism 20 (shown in FIG. 1), may be adjusted by the operator. The channels 72, 74, and 76 controlled by the pressure regulator serve to supply an oxyfuel gas mixture of a proper ratio for preheat and a pure oxygen stream for cutting to the torch tip portion 19. By adjusting or controlling the flow rate in the channels 72, 74 and 76 from the microprocessor 40 (shown in FIG. 1), the operator can set the precise oxyfuel gas mixture desired. For machine cutting, oxygen is normally controlled by numerical control.

When a flame is formed between the torch 18 and the workpiece 17, a electric current flows through the current sensing resistor 37 and the current sensing resistor 37 serves to generate a current sense signal which is a voltage drop thereacross. The current sense signal is coupled to the amplifier 35 wherein the current sense signal is amplified to a manageable scale for the post processing thereof. The amplified current sense signal is then coupled to the microprocessor 40 and the low pass filter 36. The low pass filter 36 serves to eliminate high frequency components of the current sense signal. Thereafter, the filtered current sense signal is also coupled to the microprocessor 40.

Figure 3A:
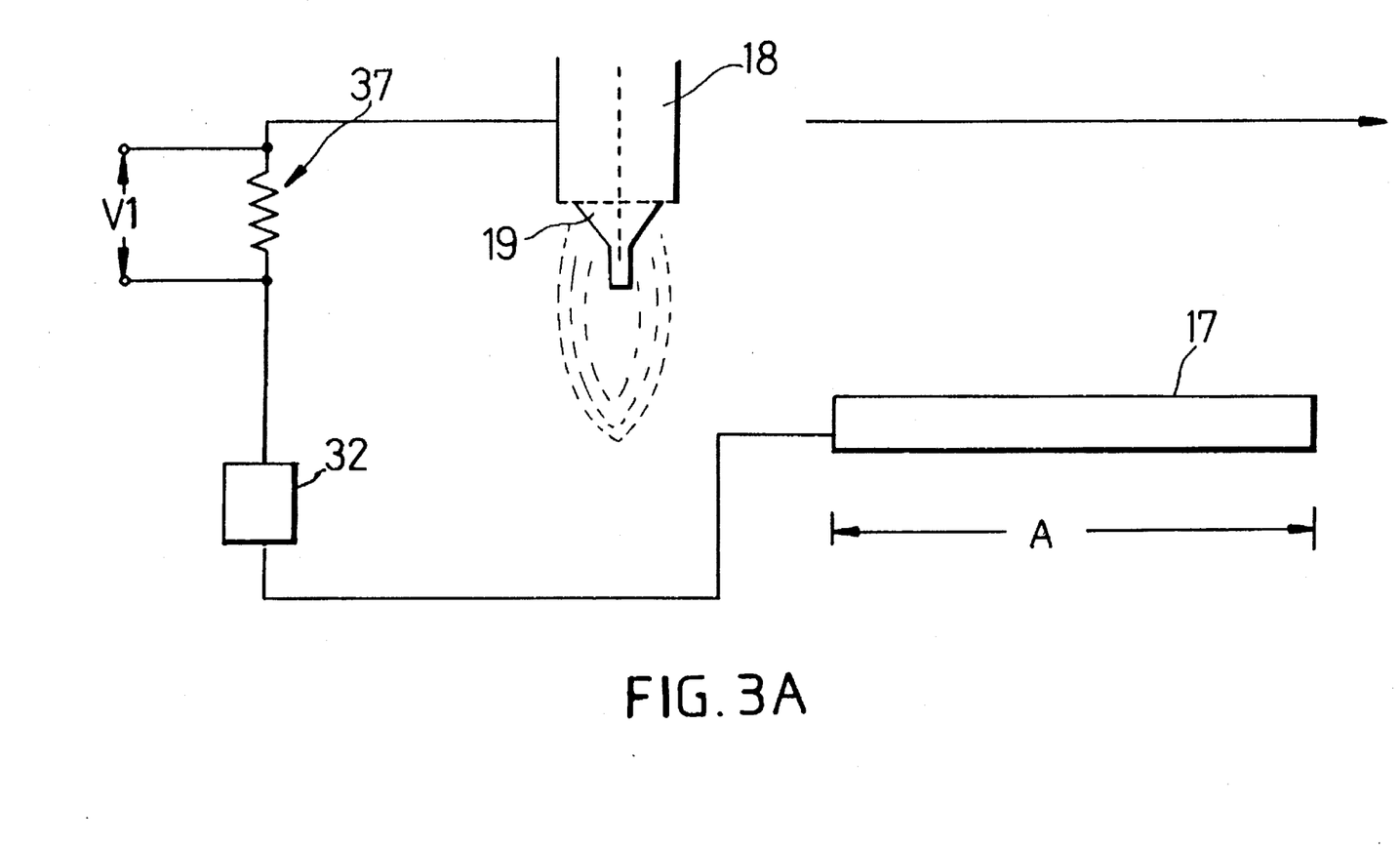
FIG. 3A is an exemplary diagram illustrating the movement of the torch.
Figure 3B:
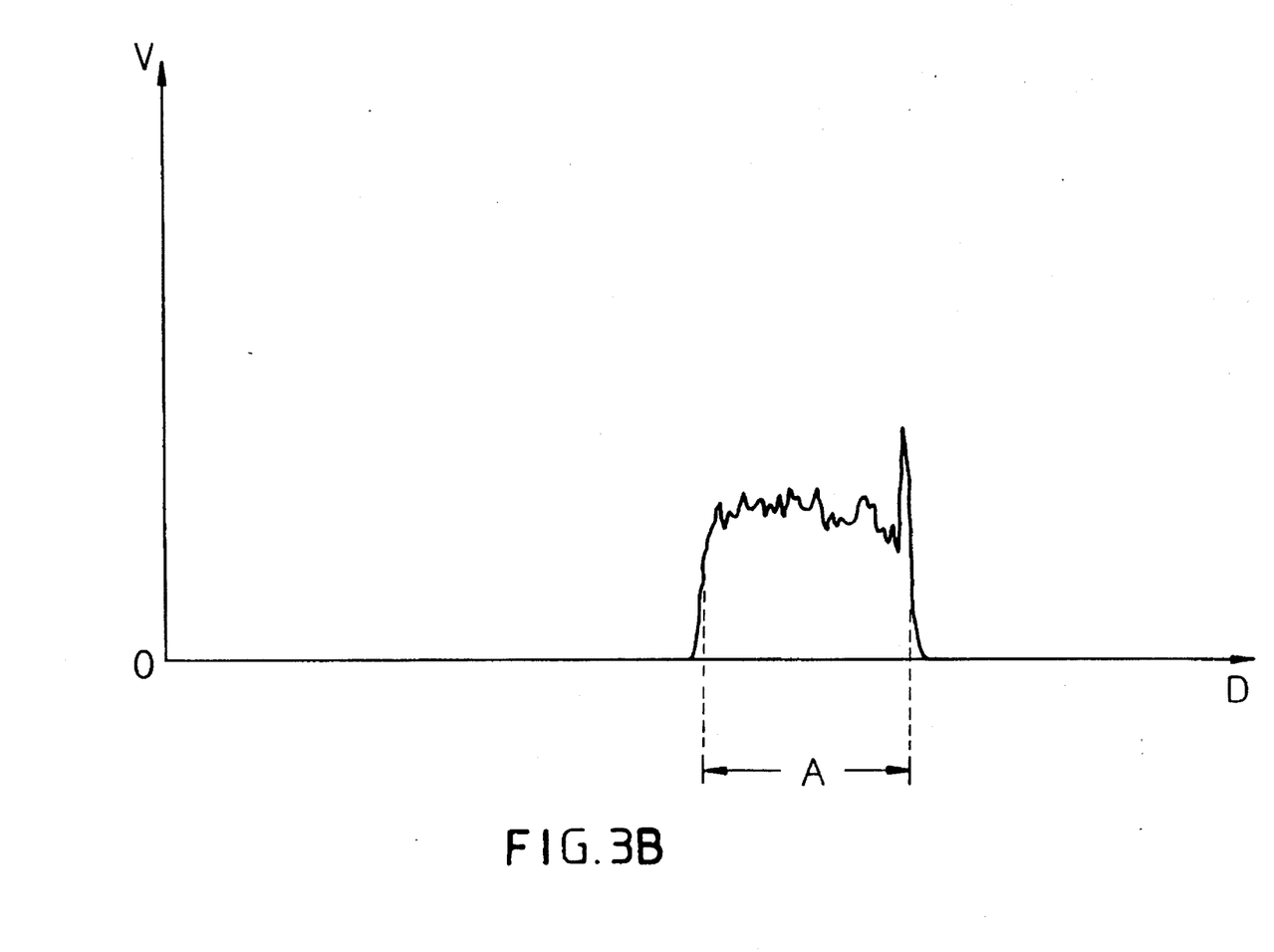
FIG. 3B is a graph showing the relationship between a detecting signal generated from the flame sensor and a corresponding torch position.

Referring now to FIGS. 3A and 3B, there are shown a schematic view illustrating the movement of the torch, and a graph depicting the relationship between the voltage drop across the current sensing resistor and the torch position. As shown, assuming that the torch, which is discharging a fuel and oxygen to form a flame, moves from left to right direction, the voltage drop V1 across the current sensing resistor 37 is detected as illustrated in the graph, wherein the vertical axis V represents the voltage and the horizontal axis D represents distance. As may be seen from the graph, it should be appreciated that the flame formed between the torch 18 and the workpiece 17 (for an interval A) allows an electric current to flow therethrough as a current channel.

Figure 4:
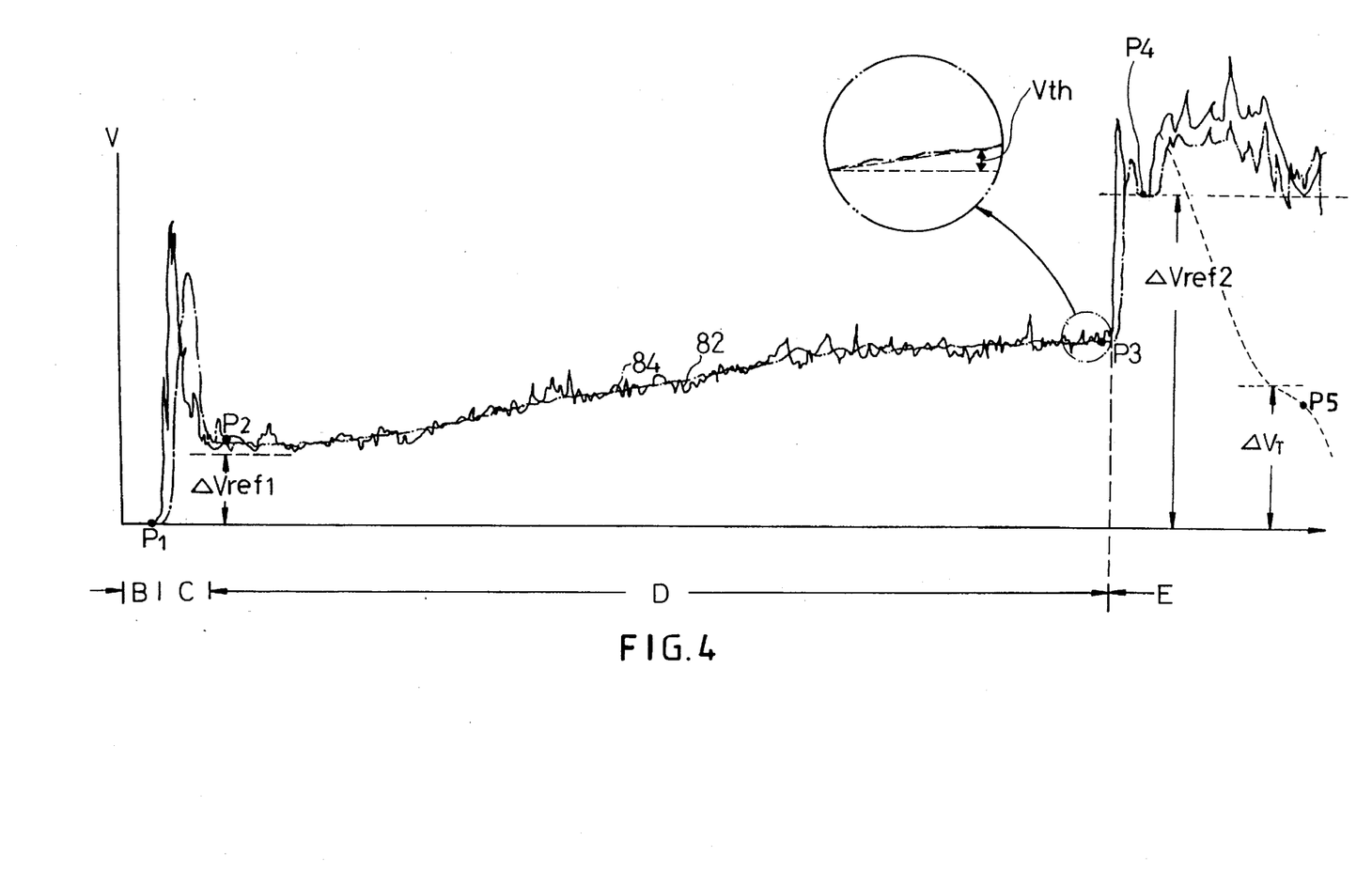
FIG. 4 is a graph representing a variation in the detection signal detected by the flame sensor during a cutting operation of the apparatus shown in FIG. 1.

Referring to FIG. 4, there is shown a exemplary graph depicting the relationship between the voltage drop across the current sensing resistor and the cutting operation, wherein the vertical axis represents voltage and the horizontal axis represents time.

Assuming that the workpiece 17 has a predetermined thickness, a height of the torch 18 spaced apart from the workpiece 17 is constant, and a predetermined voltage source 32 is provided, the cutting process makes use of a controlled chemical reaction to remove the preheated workpiece by rapid oxidation in a stream of pure oxygen provided from the torch 18 shown in FIG. 2. If the torch 18 is not located over the workpiece 17, the voltage drop P1 across the voltage sense resistor 37 shown in FIG. 2 is "0" (for a time interval B).

In order to start a cut at the edge of the workpiece 17, the preheat flame is then placed just over the edge to heat the workpiece 17. As the flame formed by torch 18 approaches the workpiece 17, the voltage drop across the voltage sensing resistor 37 varies from a point P1 to a point P2 wherein the jagged line 82 represents an amplified voltage sense signal outputted from the amplifier 35 as shown in FIG. 2 and the curve 84 (a dashed and dotted line) represents a filtered current sense signal outputted from the lowpass filter 36. A voltage drop sensed during an initial time period C is considered as transient; and, therefore, the voltage drop detected during this period is discarded by the microprocessor 40 shown in FIG. 1.

The cutting begins by heating a small area on the surface of the workpiece 17 to an ignition temperature ranging from 1400° to 1600° F. with an oxyfuel gas flame. Upon reaching this temperature, the surface of the workpiece 17 will appear bright red and the voltage drop approximates a constant voltage P3: a differential value of the voltage dv/dt approaches to zero (for a time interval D, or called the preheating step).

When the plate is heated to red, the cutting oxygen is turned on, and the torch moves over the plate to start the cut. That is, a cutting oxygen stream is then directed at the preheated spot, causing a rapid oxidation of the heated workpiece and generating a large amount of heat. This heat supports a continued oxidation of the workpiece 17 until a desired configuration is obtained (for an interval E or called the cutting step). The combusted gas and pressurized oxygen jet flush the molten oxide away, exposing fresh surfaces for cutting in this manner, the workpiece 17, e.g., a metal piece, in the path of the oxygen jet burns. During the cutting step, the voltage drop is greatly increased from the point P3 to a point P4.

As may be seen from the above, it should be appreciated that a first voltage deviation $\Delta V_{ref1}$ and a second voltage deviation $\Delta V_{ref2}$ are preferably used for detecting the edge of the workpiece 17 and the starting point of the cutting process, respectively. The information representative of the above mentioned steps or time intervals is returned back from the numerical control function to the determination function. During the preheating step, the differential value of the voltage dv/dt is also used for detecting the completion of the preheating step when the differential value dv/dt approximates "0" as shown in the right end of the time interval D. Therefore, the first and the second voltage deviations $\Delta V_{ref1}$ and $\Delta V_{ref2}$, and a threshold differential value $V_{th}$ are pre-stored in the ROM 44 as shown in FIG. 1. Preferably, an experimentally preselected tolerance is provided into these voltage deviations in order to prevent noises from disrupting the decision making process of the microprocessor 40 shown in FIG. 1.

Figure 5:
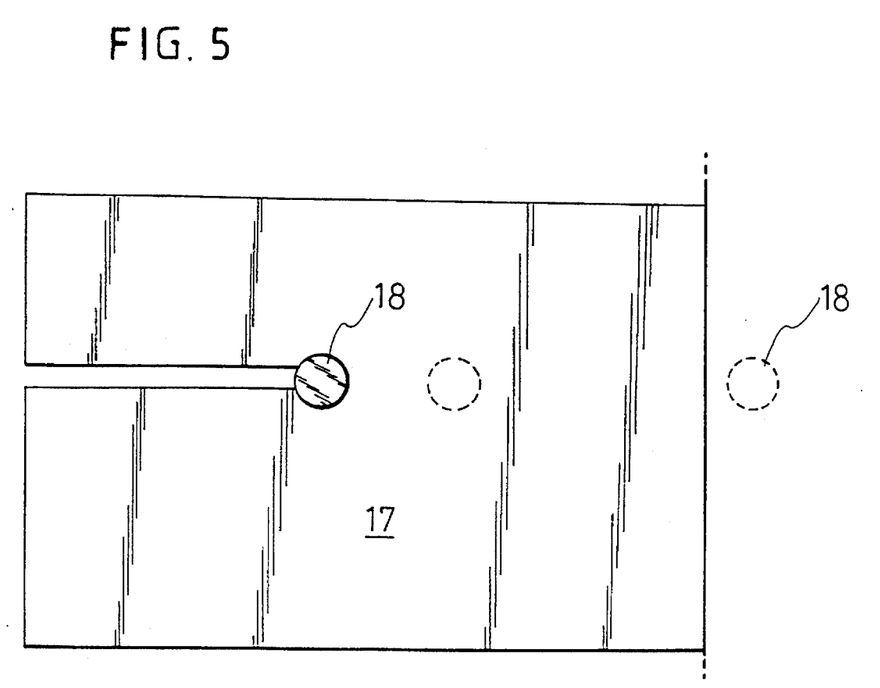
FIG. 5 is a diagrammatical view explaining a step of cutting the workpiece.

Referring to FIG. 5, there is shown a diagram illustrating the cutting step of the workpiece. When the workpiece is normally cut, the voltage drop P4 is detected as shown in FIG. 4. However, when the cutting of the workpiece 17 is interrupted (phantom line) due to a surface defect such as tarnish, overspeed of the torch 18 or insufficiency of the preheating, the voltage drop becomes lower than that of the normal cutting. Further, when the torch 18 breaks away from the workpiece 17 on the completion of the cutting as shown in phantom lines, the voltage drop becomes '0'.

Referring back to FIGS. 1 and 4, the amplified current sense signal and the filtered current sense signal are continuously coupled to the microprocessor 40 in which one of the amplified and filtered current sense signals is used as a present voltage drop. In the time intervals C and E, the microprocessor 40 compares the present voltage drop with a reference voltage drop P1 and determines the present voltage deviation. The determined present voltage deviation is compared with the first or second voltage deviation $\Delta V_{ref1}$ and $\Delta V_{ref2}$. If the present voltage deviation is identical to or greater than the first or second voltage deviation $\Delta V_{ref1}$ and $\Delta V_{ref2}$, the determination function of the microprocessor 40 generates a first or a second decision signal representative of respective time interval C or D which is coupled to the numerical control function of the microprocessor 40. In the tim interval D, the determination function calculates the present differential value of the voltage through the use of the present voltage drop and the previous voltage drop detected just prior thereto. If the present differential value is identical to or smaller than the threshold differential value $V_{th}$, the determination function serves to generate a third decision signal representative of the completion of the preheating step.

As is shown in FIG. 4, if, during the cutting, the present voltage deviation is lower than a threshold voltage deviation $\Delta V_T$ which is pre-stored in the ROM 44, the determination function of the microprocessor 40 determines that an uncut portion exists, and generates a third decision signal. When the torch 12 spews out the flame, the flame functions as a electric current channel, thereby enabling the measurement of the height of the torch 18 spaced apart from the workpiece 17. A current flowing through the flame is decreased as the distance between the torch and the workpiece is increased, and the voltage drop across the current sense resistor 37 is decreased. Therefore, it should be appreciated that the height of the torch 18 spaced apart from the workpiece is automatically adjusted.

Figure 6:
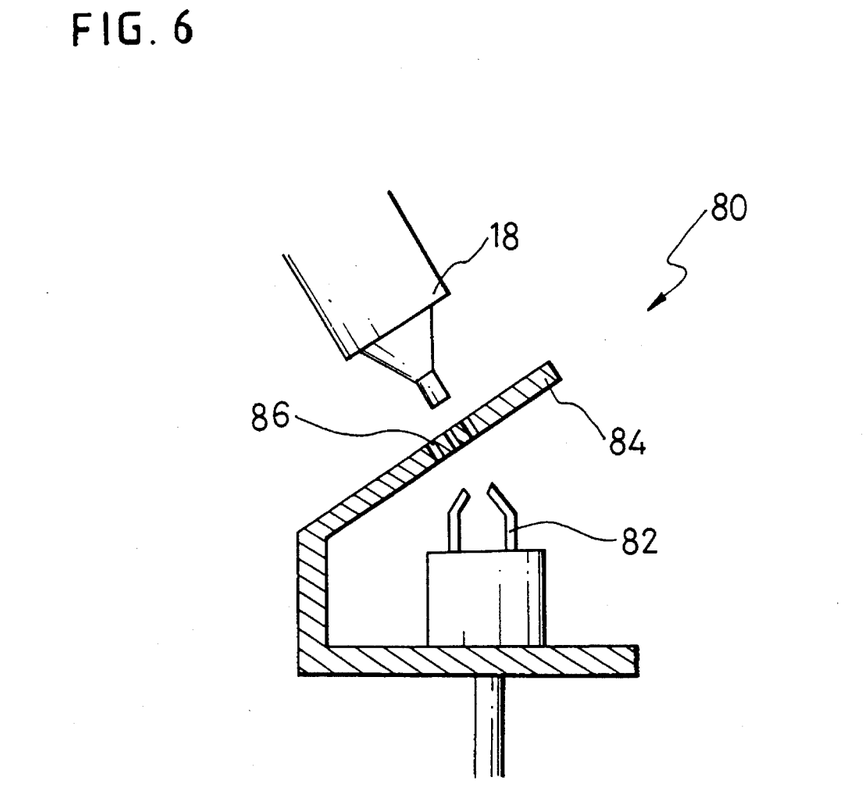
FIG. 6 is a front view of an ignition device designed to ignite the torch.

Referring to FIG. 6, there is illustrated a front view of an ignition device 80 for causing the torch to produce the flame. The ignition device 80 includes an igniter 82 and a plate 84 having a number of through holes 86. The through-holes 86 of the plate 84 are positioned between the igniter 82 and the torch 18 to provide a passage for ensuring that a spark from the igniter 82 reach up to the torch 18. Consequently, when a fuel gas is discharged from the torch 18, the spark ignites the fuel gas to produce a flame. The plate 84 and the torch 18 are also electrically connected the flame as shown in FIG. 2. As a result, when the torch 18 does not spurt the flame, the voltage drop across the current sensing resistor 37 becomes zero since the current does not flow between the torch 18 and the plate 84; and when the torch 18 emits the flame, the voltage drop jumps from the point P1 up to a point P2 as shown in FIG. 4, facilitating the detection thereof by the flame sensor of the present invention.

Figure 7:
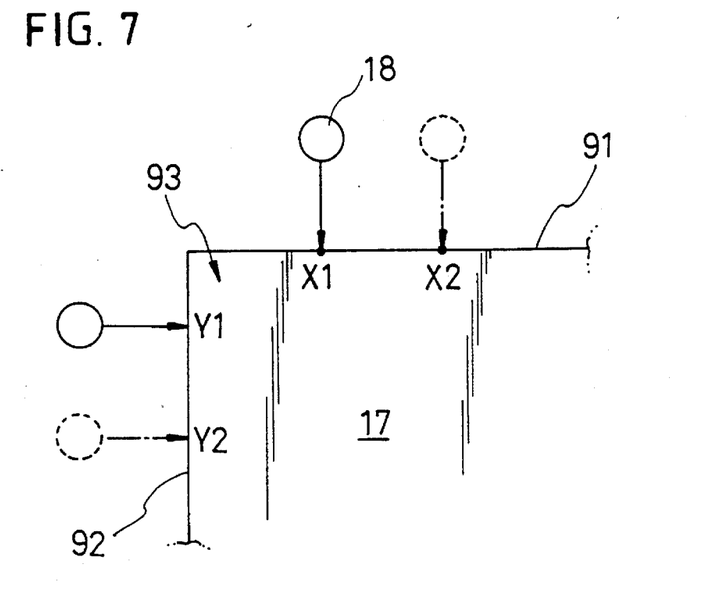
FIG. 7 is a picture describing the process of detecting a corner portion of the workpiece.

Referring to FIG. 7, there is shown a diagram illustrating a detection process of a corner portion of the workpiece. While the torch 18 moves to the workpiece 17, the voltage drop does not occur until the torch 18 reaches the edge of the workpiece 17. The voltage drop sharply rises up to the point P2 as shown in FIG. 4 upon its contact with the workpiece 17. When the workpiece 17 has a rectangular shape, the flame of the torch 18 primarily moves toward to one edge 91 to make the processor recognize a set of coordinates X1 and X2. The process is repeated in a manner similar to the above in order to obtain another set of coordinates Y1 and Y2. As is well known in the art, the two sets of coordinates may be used for determining the corner portion 93 through the use of a computer program.

Figure 8A:
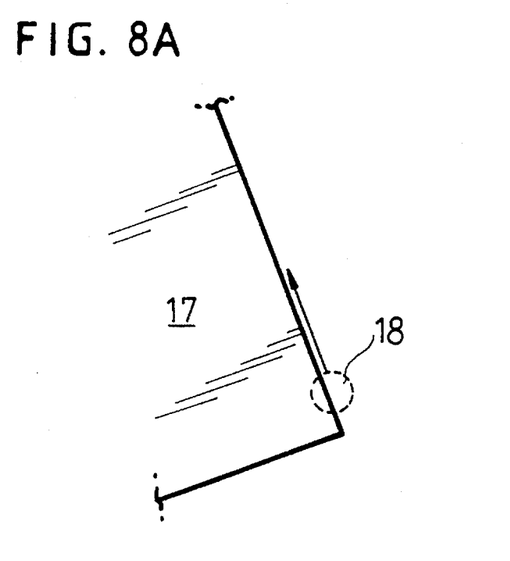
FIGS. 8a, 8b, 8c and 8d are a series of diagrams demonstrating the process of machining the edge portion of the workpiece.
Figures 8B, 8C:
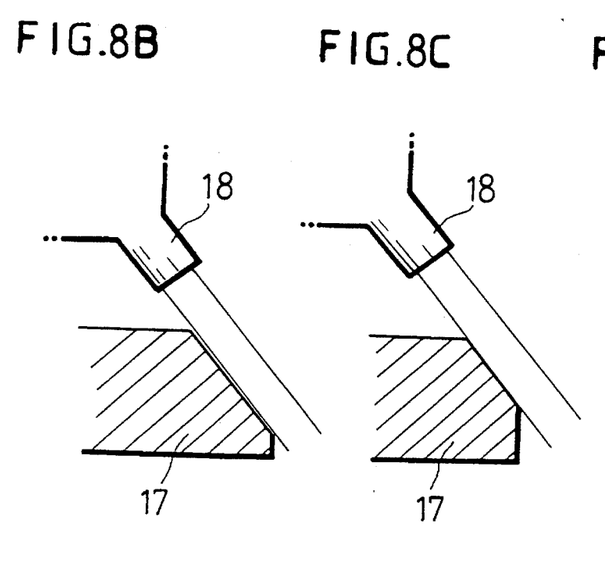
Figure 8D:
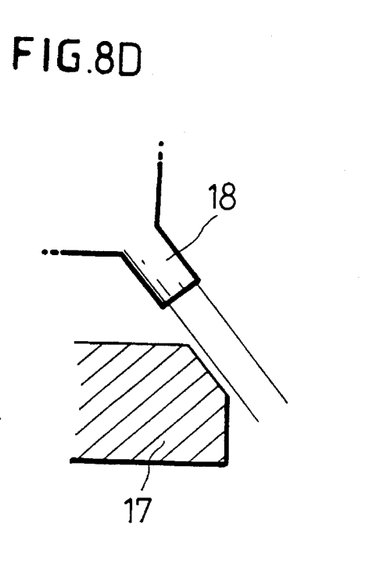

Referring to FIG. 8, there is shown a series of views illustrating the machining process of an edge of the workpiece, which the machining process is known to those skilled in the art as "bevel cutting". The torch 18 moves along the edge of the workpiece to accomplish the bevel cutting as shown in FIG. 8A. FIG. 8B shows a normal bevel cutting in which a predetermined distance between the torch 18 and the workpiece is maintained. However, when the torch 18 is spaced apart from the workpiece 17 as shown in FIGS. 8C and 8D and vice versa, the voltage drop, which is greater than the third voltage deviation $\Delta V_T$ but smaller than the second voltage deviation $\Delta V_{ref2}$, occurs as the distance between the torch and the edge of the workpiece is increased. The microprocessor 40 recognizes that the torch breaks away from the edge of the workpiece 17 to leave an incorrect bevel cutting.

As may be seen from the above, when the torch is located at a higher position than a predetermined height, since the voltage deviation detected by the flame sensor 30 has a lower value than a predetermined value, the processor sends the control signal to the cutting mechanism 20 shown in FIG. 1 in order to lower the elevation of the torch 18. On the other hand, if the torch 18 is located at a lower position than the predetermined height, since the voltage deviation has a higher value than the predetermined value, the processor sends the control signal to raise the torch portion. Further, the decision making function of the microprocessor 40 responses to information representative of the current operational state provided from the numerical function thereof and monitors the voltage deviation detected from the sensor 30 to generate a decision making signal representative of the state of the flame formed between the torch and workpieces. Thereafter, the numerical control function response to the decision making signal and generate a control signal in order to control the mechanical component through the use of the cutting mechanism 20 which response to the control signal.

As may be seen from the above, it should be appreciated that the inventive gas cutting apparatus employs the flame sensor to automatically control the torch by measuring the current flow through a flame formed between the torch and the workpiece. Further, the flame sensor, which is capable of directly detecting the electric current flow through the flame, can be provided in any application requiring the detection of the flame condition. Although the flame sensor includes a voltage source, the electrical current flowing through the flame can be preferably detected without the voltage source.

Although the invention has been shown and described with respect to the exemplary embodiments, various changes, modifications and additions may be made without departing from the spirit and scope of the invention.

What is claimed is:

1. A gas cutting apparatus for cutting a workpiece in accordance with a predetermined contour, having a torch and a torch drive means, wherein the torch has a fuel gas supply channel for supplying a fuel gas, a first oxygen channel for supplying a stream of oxygen in order to produce a preheating flame for preheating the workpiece, and a second oxygen channel for supplying another stream of oxygen to produce a cutting flame for cutting the workpiece, which comprises:

a flame sensing means for generating a first and a second current sense signals representative of the amount of electric signals flowing through the preheating and the cutting flames, respectively, formed between the torch and the workpiece;

means responsive to the first current sense signal for generating a first control signal representative of the completion of the preheating; and a control means responsive to the first control signal and the second current sense signal for generating a second control signal for use in operating the torch drive means.

2. The gas cutting apparatus as recited in claim 1, wherein the flame sensing means includes a first terminal coupled to the torch; a second terminal coupled to the workpiece; and a sensing means for detecting an electric current between the first and the second terminals, and generating the first and the second current sense signals.

3. The gas cutting apparatus as recited in claim 2, wherein the sensing means includes:

a voltage source for supplying the electric current to the first and the second terminals;

a current sensing resistor coupled between the first terminal and the voltage source; and a means for amplifying a voltage drop across the current sensing resistor and for generating the first and the second current sense signals representative of the amplified voltage drop.

4. The gas cutting apparatus as recited in claim 3, wherein the sensing means further includes means for filtering the amplified voltage drop to eliminate high frequency components contained therein, and for generating the first and the second current sense signals representative of the filtered voltage drop.

5. The gas cutting apparatus as recited in claim 4, further comprising an edge detecting means for detecting an edge of the workpiece, which includes means for storing a reference voltage drop representative of a ground voltage, and a first reference voltage deviation representative of the difference between the reference voltage drop and a first predetermined voltage drop; means, in response to the first current sense signal, for generating a first present voltage deviation representative of the difference between the reference voltage drop and the first current sense signal; and means for comparing the first present voltage deviation with the first reference voltage deviation to generate an edge detection signal representative of the detection of an edge when the first present voltage deviation is greater than the first reference voltage deviation.

6. The gas cutting apparatus as recited in claim 5, wherein said means for generating the first control signal includes:

means for storing a threshold differential value;

means for generating a present differential value of the first current sense signal; and means for comparing the present differential value with the threshold differential value to generate the first control signal representative of the completion of the preheating when the present differential value is smaller than the threshold differential value.

7. The gas cutting apparatus as recited in claim 6, wherein said control means includes:

means for storing a second reference voltage deviation representative of the difference between the reference voltage drop and a second predetermined voltage drop which is greater than the first predetermined voltage drop;

means for generating a second present voltage deviation between the second current sense signal and the reference voltage drop; and means for comparing the second present voltage deviation with the second reference voltage deviation to provide the second control signal.

8. The gas cutting apparatus as recited in claim 7, further comprising an uncut portion detecting means, which includes means for storing a third reference voltage deviation representative of the difference between the reference voltage drop and a third predetermined voltage drop which is greater than the first predetermined voltage drop and smaller than the second predetermined voltage drop; means for comparing the second present voltage deviation with the third reference voltage deviation to generate an uncut portion signal representative of an occurrence of an uncut portion when the second present voltage deviation is smaller than the third reference voltage deviation.

* * * * *